United States Patent
Gilleladen et al.

(10) Patent No.: US 11,606,965 B2
(45) Date of Patent: Mar. 21, 2023

(54) LACTIC ACID BACTERIA FOR A HEAT-TREATED FOOD PRODUCT FOR STORAGE AT AMBIENT TEMPERATURE

(71) Applicant: CHR. HANSEN A/S, Hoersholm (DK)

(72) Inventors: Christian Gilleladen, Copenhagen (DK); Jeorgos Trihaas, Oelsted (DK); Thomas Janzen, Broenshoej (DK); Mette Oehrstroem Runge, Snekkersten (DK)

(73) Assignee: Chr. Hansen A/S, Hoersholm (DK)

( * ) Notice: Subject to any disclaimer, the term of this patent is extended or adjusted under 35 U.S.C. 154(b) by 21 days.

(21) Appl. No.: 16/300,451

(22) PCT Filed: May 11, 2017

(86) PCT No.: PCT/EP2017/061270
§ 371 (c)(1),
(2) Date: Nov. 9, 2018

(87) PCT Pub. No.: WO2017/194650
PCT Pub. Date: Nov. 16, 2017

(65) Prior Publication Data
US 2019/0183160 A1    Jun. 20, 2019

(30) Foreign Application Priority Data

May 11, 2016 (EP) .................. 16169215
Nov. 4, 2016 (EP) .................. 16197223

(51) Int. Cl.
*A23L 33/135* (2016.01)
*A23C 9/123* (2006.01)
*A23C 9/12* (2006.01)

(52) U.S. Cl.
CPC .............. *A23L 33/135* (2016.08); *A23C 9/12* (2013.01); *A23C 9/1234* (2013.01); *A23C 9/1238* (2013.01); *A23Y 2220/63* (2013.01); *A23Y 2220/73* (2013.01)

(58) Field of Classification Search
CPC ....... A23L 33/135; A23C 9/12; A23C 9/1234; A23C 9/1238; A23Y 2220/63; A23Y 2220/73
USPC ............... 426/34, 42, 43, 580, 583
See application file for complete search history.

(56) References Cited

U.S. PATENT DOCUMENTS 9,485,992 B2   11/2016   Hornbaek et al.
2010/0009034 A1   1/2010   Ling 2010/0015285 A1   1/2010   Ling
2011/0150852 A1   6/2011   Chambaud et al.
2013/0195917 A1   8/2013   Eskesen
2013/0295226 A1   11/2013   Hornbaek et al.
2015/0079057 A1   3/2015   Hornbaek et al.

FOREIGN PATENT DOCUMENTS

| CN | 101323850 A | 12/2008 |
| CN | 102492643 A | 6/2012 |
| CN | 104694418 | 6/2015 |
| EP | 0 555 618 | 8/1993 |
| EP | 1 514 553 A1 | 3/2005 |
| EP | 1 289 380 B1 | 9/2006 |
| JP | 2015-515273 | 5/2015 |
| WO | WO-2004/069156 A2 | 8/2004 |
| WO | WO-2008/116356 A1 | 10/2008 |
| WO | WO-2009/116864 A1 | 9/2009 |
| WO | WO-2013/153074 A1 | 10/2013 |
| WO | WO-2015/169928 A1 | 11/2015 |
| WO | WO-2015/193459 A1 | 12/2015 |
| WO | WO-2017/037052 A1 | 3/2017 |

OTHER PUBLICATIONS

Barroso et al., "Durchführungsverordnung (EU) Nr. 451/2012 Der Kommission," Amtsblatt der Europäischen Union, pp. 55-63 (May 2012), XP05531026, Retrieved from the Internet: URL: <http://www.feedcheck.de/Verordnungen/Verordnungen2012/Texte/Menuepunkte/451-2012> [retrieved on Oct. 13, 2016].
Commision Implementing Regulation (EU) No. 451/2012, Official Journal of the European Union p. 55-63 (May 30, 2012) [Retrieved on Oct. 26, 2020], Available online: https://eur-lex.europa.eu/legal-content/EN/TXT/PDF/?uri=CELEX:320.

*Primary Examiner* — Leslie A Wong
(74) *Attorney, Agent, or Firm* — Foley & Lardner LLP

(57) ABSTRACT

Process for producing an ambient storage food product comprising providing a food product with a pH of between 3.4 and 4.4, subjecting the food product to a heat treatment to obtain a heat treated food product, adding aseptically to the heat treated food product one or more of ambient storage lactic acid bacteria strains to obtain an ambient storage food product, and storing the ambient storage food product at ambient temperature for a period of time, wherein the ambient storage lactic acid bacteria strain is selected from the group consisting of strains, (i) wherein the strain is capable of retaining viability at the end of 150 days at a temperature of 25#C, and (ii) wherein the pH at most decreases 0.8 units during the storage period, and (iii) wherein the strain is selected from the group consisting of *Lactobacillus paracasei, Lactobacillus rhamnosus, Lactobacillus fermentum* and *Lactobacillus delbrueckii* subsp. *bulgaricus*, and mutants and variants thereof.

14 Claims, No Drawings

LACTIC ACID BACTERIA FOR A HEAT-TREATED FOOD PRODUCT FOR STORAGE AT AMBIENT TEMPERATURE

CROSS-REFERENCE TO RELATED APPLICATIONS

The present application is the U.S. National Stage of International Application PCT/EP2017/061270, filed May 11, 2017, and claims priority to European Patent Application No. 16169215.7, filed May 11, 2016 and European Patent Application No. 16197223.7, filed Nov. 4, 2016.

FIELD OF THE INVENTION

The present invention relates to lactic acid bacteria, which are suitable for adding to a heat-treated food product with a pH of between 3.4 and 4.4 to be stored at ambient temperature.

BACKGROUND OF THE INVENTION

In recent years fermented dairy products, such as yogurts, which can be stored, transported, handled and consumed in non-refrigerated conditions, i.e. at ambient temperature, for several months have become widely used. Such yogurts allow the consumer to carry the yogurt with him/her for a period of time without the need for refrigeration in the same manner as is possible for a number of beverages, and hence such yogurts provide a significant convenience advantage for the consumer. In order to obtain such a long-term shelf life at ambient temperature, the yogurt has been heat-treated after completion of the fermentation process to kill or at least inhibit further growth of the bulk of the lactic acid bacteria used in the fermentation process. The heat-treatment may e.g. be a pasteurization process or an Ultra High Temperature (UHT) process. Such yogurts are sometimes referred to as Post Pasteurization Yogurt or as Ambient Yogurt.

Post Pasteurization Yogurt products contain no or only few viable lactic acid bacteria. However, it is desired that Post Pasteurization Yogurt products contain lactic acid bacteria and or probiotic bacteria in order to provide the consumers with the various benefits of such bacteria, e.g. health and food supplement benefits. Of course the addition of live bacteria to Post Pasteurization Yogurt products to be stored at ambient temperatures introduces the technical problem that the bacteria will propagate to an extent where the yogurt will spoil, e.g. by a decrease of pH. In the prior art this technical challenge has been addressed in a number of different ways. For example, the bacteria cultures to the Post Pasteurization Yogurt products have been added in the to the Post Pasteurization Yogurt products in the form of spores. Also, the bacteria cultures for addition to the Post Pasteurization Yogurt products have been added in the form of powdered, dried, freeze-dried, coated or encapsulated cultures. Furthermore, the bacteria cultures for addition to the Post Pasteurization Yogurt products have been inactivated e.g. by irradiation, microwave treatment, antibiotics, mild pasteurization, chemical agents (inhibitor) or adjustment of pH, water activity or temperature.

WO2009/116864 discloses a dairy product containing spores of probiotic bacteria, wherein the dairy product can be stored at non-refrigerated temperatures for an extended period of time.

WO2004/069156 discloses food products containing probiotic bacteria, which has been inactivated by irradiation, microwave treatment, antibiotics, mild pasteurization and chemical agents (inhibitor).

EP-B1-1 289 380 discloses a food product, such as dairy products, containing non-viable *Lactobacillus* bacteria. The *Lactobacillus* may be rendered non-viable e.g. by mild heat-treatment, pH adjustment or water activity adjustment.

EP-B1-1 514 553 discloses a double-coated lactic acid bacteria powder with high survival rate in the human body, wherein the lactic acid bacteria have been coated doubly by a protein and a polysaccharide.

CN101323850 discloses a process of producing microcapsules of *Lactobacillus helveticus* in microencapsulated form having a strong heat resistance.

EP-B1-0 555 618 discloses a dietary product containing lyophilized lactic acid bacteria.

CN102492643 discloses a *Lactobacillus rhamnosus* strain GRX19 and its application in a starter culture for producing a fermented milk product containing live *Lactobacillus* bacteria. The fermented milk product is subjected to heat treatment, e.g. at 70-75° C. for 15-20 seconds, and the *Lactobacillus* strain is resistant to said heat treatment in that a fraction of the bacteria, e.g. 10exp7 CFU/ml survives the heat treatment. After heat treatment the heat-treated product is filled aseptically into a container and stored at room temperature for e.g. 30 days.

WO2015/169928 discloses a liquid dairy composition suitable for making a foamed dairy product, wherein the composition is shelf-stable under ambient storage conditions, has a pH of between 3.8 and 4.4 and comprises fermented milk, up to 0.12% hydrolyzed whey protein, up to 5% fat, and up to 1% high methylester pectin.

US20100009034 discloses a process of preparing a fermented milk beverage keeping high viable cell count at ambient temperature comprising performing a milk fermentation using a conventional starter culture of lactic acid bacteria, diluting, mixing and sterilizing, and adding *Lactobacillus rhamnosus* ATCC 53103 to the mixed milk beverage at aseptic conditions.

US20100015285 discloses a process of preparing a direct-acidified milk beverage keeping high viable cell count at ambient temperature comprising performing direct acidification by adjusting the pH to 4.0-4.5 to obtain acidified milk beverage, sterilizing, and adding *Lactobacillus rhamnosus* ATCC 53103 together with 0.01-0.3% growth promoting factors, e.g. a carbohydrate, to the mixed milk beverage at aseptic conditions.

There is a need for developing improved Post Pasteurization Yogurt products containing viable lactic acid bacteria.

SUMMARY OF THE INVENTION

In one aspect the present invention relates to a process for producing an ambient storage food product comprising providing a food product with a pH of between 3.4 and 4.4, subjecting the food product to a heat treatment so as to reduce the level of bacteria to no more than 1×10exp02 CFU per g to obtain a heat treated food product, adding aseptically to the heat treated food product one or more of ambient storage lactic acid bacteria strains in a total amount of at least 1.0×10exp03 CFU per g to obtain an ambient storage food product, and storing the ambient storage food product at ambient temperature for a period of time, wherein the ambient storage lactic acid bacteria strain is selected from the group consisting of strains, (i) wherein the strain when added in an amount of 2.5×10exp07 CFU per g to a fermented milk test product in the form of yogurt obtained by fermentation with a starter culture containing *Streptococcus thermophilus* and *Lactobacillus delbrueckii bulgaricus* at a temperature of 43° C. to a pH of 4.3, which has been heat treated at 75° C. for 30 seconds, is capable of retaining viability in an amount of at least 1.0×10exp03 CFU/g at the end of a storage period of the test product of 150 days at a temperature of 25° C., and (ii) wherein the pH of the test product at most decreases 0.8 units during the storage period, and (iii) wherein the strain is selected from the group consisting of *Lactobacillus paracasei, Lactobacillus rhamnosus, Lactobacillus fermentum* and *Lactobacillus delbrueckii* subsp. *bulgaricus*, and mutants and variants thereof.

The present invention is based on the unexpected experimental finding that bacterial strains of *Lactobacillus paracasei* and *Lactobacillus rhamnosus* when added to a yogurt product subjected to storage at ambient temperature is capable of retaining viability at a certain level without decreasing the pH level in any significant degree for a period of at least 150 days. This is a surprising finding, since in a milk substrate lactic acid bacteria will grow on the carbohydrate source available while reducing the pH until the pH reaches a level, where the bacteria is unable to live, so in general lactic acid bacteria in a milk substrate will either be in a growing pH-reducing state or be dead.

In another aspect the present invention relates to a lactic acid bacteria strain for use in an ambient storage food product, wherein the product has a pH of between 3.4 and 4.4, wherein the product contains at least 1.0×10exp03 CFU per g of the strain, wherein the ambient storage food product is stored at ambient temperature for a period of time, and wherein the lactic acid bacteria strain is selected from the group consisting of strains, (i) wherein the strain when added in an amount of 2.5×10exp07 CFU per g to a fermented milk test product in the form of yogurt obtained by fermentation with a starter culture containing *Streptococcus thermophilus* and *Lactobacillus delbrueckii bulgaricus* at a temperature of 43° C. to a pH of 4.3, which has been heat treated at 75° C. for 30 seconds, is capable of retaining viability in an amount of at least 1.0×10exp03 CFU/g at the end of a storage period of the test product of 150 days at a temperature of 25° C., and (ii) wherein the pH of the test product at most decreases 0.8 units during the storage period, and (iii) wherein the strain is selected from the group consisting of *Lactobacillus paracasei, Lactobacillus rhamnosus, Lactobacillus fermentum* and *Lactobacillus delbrueckii* subsp. *bulgaricus*, and mutants and variants thereof.

DETAILED DISCLOSURE OF THE INVENTION

Process for Producing an Ambient Storage Food Product

The present invention relates to a process for producing an ambient storage food product comprising providing a food product with a pH of between 3.4 and 4.4, subjecting the food product to a heat treatment so as to reduce the level of bacteria to no more than 1×10exp02 CFU per g to obtain a heat treated food product, adding aseptically to the heat treated food product one or more of ambient storage lactic acid bacteria strains in a total amount of at least 1.0× 10exp03 CFU per g to obtain an ambient storage food product, and storing the ambient storage food product at ambient temperature for a period of time, wherein the ambient storage lactic acid bacteria strain is selected from the group consisting of strains, (i) wherein the strain when added in an amount of 2.5×10exp07 CFU per g to a fermented milk test product in the form of yogurt obtained by fermentation with a starter culture containing *Streptococcus thermophilus* and *Lactobacillus delbrueckii bulgaricus* at a temperature of 43° C. to a pH of 4.3, which has been heat treated at 75° C. for 30 seconds, is capable of retaining viability in an amount of at least 1.0×10exp03 CFU/g at the end of a storage period of the test product of 150 days at a temperature of 25° C., and (ii) wherein the pH of the test product at most decreases 0.8 units during the storage period, and (iii) wherein the strain is selected from the group consisting of *Lactobacillus paracasei, Lactobacillus rhamnosus, Lactobacillus fermentum* and *Lactobacillus delbrueckii* subsp. *bulgaricus*, and mutants and variants thereof.

In a preferred embodiment, the ambient storage strain is capable of retaining viability in an amount of at least 1.0×10exp03 CFU/g, preferably at least 5.0×10exp03 CFU/g, more preferably at least 1.0×10exp04 CFU/g, more preferably at least 5.0×10exp04 CFU/g and most preferably at least 1.0×10exp05 CFU/g at the end of the storage period.

Preferably, the pH at most decreases 0.7, preferably 0.6, preferably 0.5, preferably 0.4, preferably 0.3, and most preferably 0.2 during the storage period.

In a preferred embodiment of the invention the strain when added in an amount of 2.5×10exp07 CFU per g to the test product increases to an amount of at least 5.0×10exp07 CFU per g, preferably 7.5×10exp07 CFU per g, and most preferably 1.0×10exp08 CFU per g.

Preferably, the increase of the amount of cells occurs within 45 days of the addition of the strain to the test product, preferably within 40 days, preferably within 35 days, preferably within 30 days, preferably within 25 days, preferably within 20 days, and most preferably within 15 days. Preferably, the amount of cells reaches a maximum within 45 days of the addition of the strain to the test product, preferably within 40 days, preferably within 35 days, preferably within 30 days, preferably within 25 days, preferably within 20 days, and most preferably within 15 days.

In a particular embodiment of the invention, the ambient storage food product is stored at ambient temperature for a period of at least one day, preferably at least 2 days, more preferably at least 3 days, more preferably at least 4 days, more preferably at least 5 days, more preferably at least 6 days, more preferably at least 7 days, more preferably at least 8 days, more preferably at least 9 days, and most preferably at least 10 days.

In a preferred embodiment of the invention, the *Lactobacillus rhamnosus* strain is a lactose-fermenting strain. The terms "lactose-fermenting" is used in the context of the present invention to characterize a strain which has the ability to use lactose either partially or completely as a source for cell growth or maintaining cell viability.

In a preferred embodiment of the invention, the *Lactobacillus paracasei* strain is selected from the group consisting of *Lactobacillus paracasei* strain LC-02, CHCC6272, deposited as DSM16572, *Lactobacillus paracasei* strain CRL 431, CHCC23026 deposited as ATCC 55544, and *Lactobacillus paracasei* strain CHCC5584 deposited as DSM32389.

In a preferred embodiment of the invention, the *Lactobacillus rhamnosus* strain is selected from the group consisting of *Lactobacillus rhamnosus* strain CHCC5366 deposited as DSM23035 and *Lactobacillus rhamnosus* LGG® deposited as ATCC53103. Preferably, the *Lactobacillus rhamnosus* strain is *Lactobacillus rhamnosus* strain CHCC5366 deposited as DSM23035.

In a preferred embodiment of the invention, the *Lactobacillus delbrueckii* subsp. *bulgaricus* strain is *Lactobacillus delbrueckii* subsp. *bulgaricus* strain CHCC18944 deposited as DSM28910. In a preferred embodiment of the invention, the *Lactobacillus delbrueckii* subsp. *bulgaricus* is a lactose-deficient strain.

In a preferred embodiment of the invention, the *Lactobacillus fermentum* strain is *Lactobacillus fermentum* strain CHCC14591 deposited as DSM32086.

In a particular embodiment of the invention the strain is selected from one of the following groups: The group consisting of *Lactobacillus paracasei, Lactobacillus rhamnosus*, and *Lactobacillus fermentum*; the group consisting of *Lactobacillus paracasei, Lactobacillus rhamnosus*, and *Lactobacillus delbrueckii* subsp. *bulgaricus*; the group consisting of *Lactobacillus paracasei, Lactobacillus fermentum*, and *Lactobacillus delbrueckii* subsp. *bulgaricus*; the group consisting of *Lactobacillus rhamnosus, Lactobacillus fermentum*, and *Lactobacillus delbrueckii* subsp. *bulgaricus*.

In a particular embodiment of the invention the strain is selected from one of the following groups: The group consisting of *Lactobacillus paracasei* and *Lactobacillus rhamnosus*; the group consisting of *Lactobacillus paracasei* and *Lactobacillus fermentum*; the group consisting of *Lactobacillus paracasei* and *Lactobacillus delbrueckii* subsp. *bulgaricus*; the group consisting of *Lactobacillus rhamnosus* and *Lactobacillus fermentum*, the group consisting of *Lactobacillus rhamnosus*, and *Lactobacillus delbrueckii* subsp. *bulgaricus*; the group consisting of *Lactobacillus fermentum*, and *Lactobacillus delbrueckii* subsp. *bulgaricus*.

A particular aspect of the invention relates to a lactic acid bacteria strain, wherein the strain is selected from the group consisting of *Lactobacillus paracasei* strain LC-02, CHCC6272, deposited as DSM16572, *Lactobacillus rhamnosus* strain CHCC5366 deposited as DSM23035, *Lactobacillus paracasei* strain CRL 431, CHCC23026 deposited as ATCC 55544, *Lactobacillus paracasei* strain CHCC5584 deposited as DSM32389, *Lactobacillus rhamnosus* LGG® deposited as ATCC53103, *Lactobacillus fermentum* CHCC14591 deposited as DSM32086, and *Lactobacillus delbrueckii* subsp. *bulgaricus* strain CHCC18944 deposited as DSM28910, and mutants and variants thereof. In particular, the strain is selected from the group consisting of any subset of the seven members of the group indicated in the preceding sentence.

A particular aspect of the invention relates to a lactic acid bacteria strain, wherein the strain is selected from the group consisting of *Lactobacillus paracasei* strain LC-02, CHCC6272, deposited as DSM16572, *Lactobacillus rhamnosus* strain CHCC5366 deposited as DSM23035, *Lactobacillus paracasei* strain CRL 431, CHCC23026 deposited as ATCC 55544, *Lactobacillus paracasei* strain CHCC5584 deposited as DSM32389, *Lactobacillus fermentum* CHCC14591 deposited as DSM32086, and *Lactobacillus delbrueckii* subsp. *bulgaricus* strain CHCC18944 deposited as DSM28910, and mutants and variants thereof. This group does not include *Lactobacillus rhamnosus* LGG® deposited as ATCC53103, which is lactose-deficient (unable to ferment lactose).

A particular aspect of the invention relates to a lactic acid bacteria strain, wherein the strain is selected from the group consisting of *Lactobacillus paracasei* strain LC-02, CHCC6272, deposited as DSM16572, *Lactobacillus rhamnosus* strain CHCC5366 deposited as DSM23035, *Lactobacillus paracasei* strain CRL 431, CHCC23026 deposited as ATCC 55544, *Lactobacillus paracasei* strain CHCC5584 deposited as DSM32389, and *Lactobacillus rhamnosus* LGG deposited as ATCC53103, and mutants and variants thereof.

A particular aspect of the invention relates to a lactic acid bacteria strain, wherein the strain is selected from the group consisting of *Lactobacillus paracasei* strain LC-02, CHCC6272, deposited as DSM16572, *Lactobacillus rhamnosus* strain CHCC5366 deposited as DSM23035, *Lactobacillus paracasei* strain CRL 431, CHCC23026 deposited as ATCC 55544, *Lactobacillus paracasei* strain CHCC5584 deposited as DSM32389, and *Lactobacillus delbrueckii* subsp. *bulgaricus* strain CHCC18944 deposited as DSM28910, and mutants and variants thereof.

A particular aspect of the invention relates to a lactic acid bacteria strain, wherein the strain is selected from the group consisting of *Lactobacillus paracasei* strain LC-02, CHCC6272, deposited as DSM16572, *Lactobacillus rhamnosus* strain CHCC5366 deposited as DSM23035, *Lactobacillus paracasei* strain CRL 431, CHCC23026 deposited as ATCC 55544, and *Lactobacillus paracasei* strain CHCC5584 deposited as DSM32389, and mutants and variants thereof.

A particular aspect of the invention relates to a lactic acid bacteria strain, wherein the strain is selected from the group consisting of *Lactobacillus paracasei* strain LC-02, CHCC6272, deposited as DSM16572, *Lactobacillus rhamnosus* strain CHCC5366 deposited as DSM23035, *Lactobacillus paracasei* strain CRL 431, CHCC23026 deposited as ATCC 55544, and *Lactobacillus paracasei* strain CHCC5584 deposited as DSM32389, and mutants and variants thereof. The five strains of this aspect of the invention are all lactose-positive.

A particular aspect of the invention relates to a lactic acid bacteria strain, wherein the strain is selected from the group consisting of *Lactobacillus paracasei* strain LC-01, CHCC2115, deposited as DSM19465, *Lactobacillus rhamnosus* strain CHCC12697 deposited as DSM24616, and *Lactobacillus paracasei* strain CHCC7155 deposited as DSM18875.

In a particular embodiment of the process of the invention, the ambient storage strain is lactose-fermenting, i.e. capable of fermenting lactose to form lactic acid and hence lower the pH of the food product. It is surprising that the lactose-fermenting strains of the present invention is suitable as strains for adding to ambient storage food products, since it will be expected that such strains during long term storage of the food product at ambient temperature will cause an undesired reduction of the pH of the food product.

In a particular embodiment of the process of the invention, the food product with a pH of between 3.4 and 4.4 is a starter culture fermented milk product provided by fermentation of a milk substrate using a starter culture of lactic acid bacteria to obtain the starter culture fermented milk product.

In a particular embodiment of the process of the invention, the starter culture fermented milk product has a protein content of more than 5.1% (w/w).

In a particular embodiment of the process of the invention, the starter culture fermented milk product is not subjected to diluting.

It is surprising that the lactose-fermenting strains of the present invention is suitable as strains for adding to a ambient storage food product in the form of an undiluted starter culture fermented milk product, because such undiluted product has a higher concentration of lactose than a diluted product.

In the following the process of the invention is described in more detail in relation to the process for producing an ambient storage fermented milk product.

The starter culture may be any conventional starter culture of lactic acid bacteria, including single strain culture and culture blends, used for producing a specific type of fermented milk product. In a preferred embodiment of the above process of the invention, the fermentation is carried out so as to obtain a pH of between 3.0 and 5.0, preferably between 3.9 and 4.8, more preferably between 4.0 and 4.6 and most preferably between 4.1 and 4.4.

The heat treatment so as to reduce the level of bacteria of the starter culture to no more than $1.0 \times 10exp02$ CFU per g fermented milk is preferably carried out by subjecting the starter culture fermented milk product to a temperature of between 50° C. and 90° C., preferably between 60° C. and 85° C., more preferably between 65° C. and 82° C., and most preferably between 70° C. and 80° C. The heat treatment is preferably carried out for a period of between 10 seconds and 180 seconds, preferably between 12 seconds and 120 seconds, more preferably between 14 seconds and 90 seconds, more preferably between 16 seconds and 60 seconds, more preferably between 18 seconds and 50 seconds and most preferably between 20 and 40 seconds. Preferably, the level of bacteria of the starter culture is reduced to no more than $1.0 \times 10exp01$ CFU per g fermented milk, more preferably 0 CFU per g.

Lactic Acid Bacteria Strain for Use in an Ambient Storage Food Product

In one aspect the present invention relates to a lactic acid bacteria strain for use in an ambient storage food product, wherein the product has a pH of between 3.4 and 4.4, wherein the product contains at least $1.0 \times 10exp03$ CFU per g of the strain, wherein the ambient storage food product is stored at ambient temperature for a period of time, and wherein the lactic acid bacteria strain is selected from the group consisting of strains, (i) wherein the strain when added in an amount of $2.5 \times 10exp07$ CFU per g to a fermented milk test product in the form of yogurt obtained by fermentation with a starter culture containing *Streptococcus thermophilus* and *Lactobacillus delbrueckii bulgaricus* at a temperature of 43° C. to a pH of 4.3, which has been heat treated at 75° C. for 30 seconds, is capable of retaining viability in an amount of at least $1.0 \times 10exp03$ CFU/g at the end of a storage period of the test product of 150 days at a temperature of 25° C., and (ii) wherein the pH of the test product at most decreases 0.8 units during the storage period, and (iii) wherein the strain is selected from the group consisting of *Lactobacillus paracasei*, *Lactobacillus rhamnosus*, *Lactobacillus fermentum* and *Lactobacillus delbrueckii* subsp. *bulgaricus*, and mutants and variants thereof.

In a particular embodiment of the strain of the present invention, the product is a chemically acidified product.

In a particular embodiment of the strain of the present invention, the product is a fermented milk product obtained by fermentation of a milk substrate using a starter culture of lactic acid bacteria, wherein the product contains no more than $1 \times 10exp02$ CFU of the starter culture per g and at least $1 \times 10exp03$ CFU per g of the ambient storage lactic acid bacteria strain.

In a particular embodiment of the strain of the present invention, the product is a fermented milk product obtained by fermentation of a milk substrate using a starter culture of lactic acid bacteria, wherein the fermented milk product after fermentation has been subjected to a heat treatment so as to reduce the level of bacteria of the starter culture to no more than $1 \times 10exp02$ CFU per g, and wherein after the heat treatment the ambient storage strain of claim 1 has been added aseptically to the heat treated product in an amount of at least $1.0 \times 10exp03$ CFU per g. Preferably, the ambient storage strain of the invention has been added aseptically to the heat treated product in an amount of at least $1.0 \times 10exp04$ CFU per g, more preferably at least $1.0 \times 10exp05$ CFU per g, more preferably at least $1.0 \times 10exp06$ CFU per g, more preferably at least $1.0 \times 10exp07$ CFU per g, and most preferably at least $1.0 \times 10exp08$ CFU per g.

In a particular embodiment of the strain of the present invention, the strain is selected from the group consisting of of *Lactobacillus paracasei* strain LC-02, CHCC6272, deposited as DSM16572, *Lactobacillus rhamnosus* strain CHCC5366 deposited as DSM23035, *Lactobacillus paracasei* strain CRL 431, CHCC23026 deposited as ATCC 55544, *Lactobacillus paracasei* strain CHCC5584 deposited as DSM32389, *Lactobacillus rhamnosus* LGG® deposited as ATCC53103, *Lactobacillus fermentum* CHCC14591 deposited as DSM32086, and *Lactobacillus delbrueckii* subsp. *bulgaricus* strain CHCC18944 deposited as DSM28910, and mutants and variants thereof.

In a particular embodiment of the strain of the present invention, the strain is selected from the group consisting of of *Lactobacillus paracasei* strain LC-02, CHCC6272, deposited as DSM16572, *Lactobacillus rhamnosus* strain CHCC5366 deposited as DSM23035, *Lactobacillus paracasei* strain CRL 431, CHCC23026 deposited as ATCC 55544, *Lactobacillus paracasei* strain CHCC5584 deposited as DSM32389, *Lactobacillus fermentum* CHCC14591 deposited as DSM32086, and *Lactobacillus delbrueckii* subsp. *bulgaricus* strain CHCC18944 deposited as DSM28910, and mutants and variants thereof.

The strain of the invention may be formulated in a composition comprising one or more of the strain according to the invention. Thus, in one embodiment the strain of the invention is formulated in a composition containing a single strain according to the invention. In another embodiment the strain is formulated in a composition containing two or more strains of the invention. The composition may be in the form of freeze-dried or frozen granules.

Ambient Storage Food Product

In a preferred embodiment of the invention, the ambient storage food product is selected from the group consisting of fermented milk products, chemically acidified milk products, fruit beverage, fermented cereal products, chemically acidified cereal products, soy milk products and any mixture thereof.

The fermented milk product typically contains protein in a level of between 2.0% by weight to 3.5% by weight. The fermented milk product may also be a low protein product with a protein level of between 1.0% by weight and 2.0% by weight. Alternatively, the fermented milk product may be a high protein product with a protein level of above 3.5% by weight, preferably above 5.1% by weight. In a particular embodiment of the fermented milk product of the invention the product is a mixture of a fermented milk product and a cereal product, e.g. an oat product, wherein the cereal product may be a fermented cereal product, e.g. a fermented oat product.

In a particular embodiment of the invention, the ambient storage food product is a fermented cereal product. The fermented cereal product may be prepared by milling the grains of a cereal biological source material to produce a cereal flour, which is then subjected to fermentation. The fermentation of the cereal flour may be carried out using the same lactic acid bacteria (starter culture) as used for fermentation of a milk substrate as described elsewhere in this application.

In a particular embodiment of the invention, the ambient storage food product is a fruit beverage. The fruit beverages may further contain e.g. oat, soy, almond, whey and/or non-fermented milk, e.g. in the form of milk powder. In a particular embodiment, the fruit beverages of the invention do not contain dairy components, such as milk. In another particular embodiment of the fruit beverage of the invention, the fruit beverage further contains a fermented milk product.

In another embodiment of the invention the ambient storage food product of the invention is a chemically acidified product. The acidification may be carried out using any acidifying agent suitable for adding to food products, such as lactic acid, citric acid, fruit juice, fruit pulp and fruit compound. In a particular embodiment, the ambient storage food product is milk acidified with fruit juice.

In a particular embodiment of the invention, the ambient storage food product is a chemically acidified cereal product. The chemically acidified cereal product may be prepared by milling the grains of a cereal biological source material to produce a cereal flour, which is then used to produce an aqueous suspension, and the pH of the said suspension is then adjusted to a desired level. In a particular embodiment, the ambient storage food product is a cereal food product acidified with a fruit beverage.

Any combination of the above-described elements, aspects and embodiments in all possible variations thereof is encompassed by the invention unless otherwise indicated herein or otherwise clearly contradicted by context.

Definitions

In connection with the present invention the terms and expressions listed below have the following meaning:

The expression "heat treatment" means any treatment using any temperature, for any period of time and by any means or equipment, which inactivates at least a portion of the bacteria of the starter culture. In this connection the term "inactivate" means any stop, reduction or inhibition of growth of the bacteria, e.g. cell lysing.

The expression "ambient storage" means storage at ambient temperature. The expression "ambient temperature" means the temperature of the surroundings, e.g. room temperature. For example, the ambient temperature may be between 5° C. and 40° C., more particularly between 10° C. and 35° C., more particularly between 15° C. and 30° C., and most particularly between 18° C. and 27° C. The ambient temperature may be controlled, i.e. the temperature is the same over the course of one full day (24 hours), or it may be uncontrolled, i.e. it varies over the course of one full day (24 hours).

The expression "viability" means the bacteria is capable of exhibiting growth (forming a colony) on an MRS agar plate incubated at anaerobic conditions at 37° C. for 3 days. The MRS agar has the following composition (g/l):

Peptone: 10.0
Beef extract: 10.0
Yeast extract: 5.0
Dextrose: 20.0
Polysorbate 80: 1.0
Ammonium Citrate: 2.0
Sodium Acetate: 5.0
Magnesium Sulfate: 0.1
Manganese Sulfate: 0.05
Dipotassium Phosphate: 2.0
Agar: 15.0

The expression "ambient storage lactic acid bacteria strain" means a lactic acid bacteria strain, which when added to a fermented milk product is suitable for ambient storage for a period of time.

The expression "starter culture fermented milk product" means a fermented milk product, which contains the starter culture used to ferment the milk.

The expression "heat treated fermented milk product" means a fermented milk product, which has been subjected to heat treatment.

The expression "ambient storage fermented milk product" means a fermented milk product, which is suitable for ambient storage for a period of time.

The expression "lactic acid bacteria" designates a gram-positive, microaerophilic or anaerobic bacterium, which ferments sugars with the production of acids including lactic acid as the predominantly produced acid, acetic acid and propionic acid. The industrially most useful lactic acid bacteria are found within the order "Lactobacillales" which includes *Lactococcus* spp., *Streptococcus* spp., *Lactobacillus* spp., *Leuconostoc* spp., *Pseudoleuconostoc* spp., *Pediococcus* spp., *Brevibacterium* spp., *Enterococcus* spp. and *Propionibacterium* spp. These are frequently used as food cultures alone or in combination with other lactic acid bacteria.

Lactic acid bacteria, including bacteria of the species *Lactobacillus* sp. and *Lactococcus* sp., are normally supplied to the dairy industry either as frozen or freeze-dried cultures for bulk starter propagation or as so-called "Direct Vat Set" (DVS) cultures, intended for direct inoculation into a fermentation vessel or vat for the production of a dairy product, such as a fermented milk product or a cheese. Such lactic acid bacterial cultures are in general referred to as "starter cultures" or "starters".

The term "milk" is to be understood as the lacteal secretion obtained by milking of any mammal, such as cows, sheep, goats, buffaloes or camels. In a preferred embodiment, the milk is cow's milk. The term milk also includes protein/fat solutions made of plant materials, e.g. soy milk.

The term "milk substrate" may be any raw and/or processed milk material that can be subjected to fermentation according to the method of the invention. Thus, useful milk substrates include, but are not limited to, solutions/-suspensions of any milk or milk like products comprising protein, such as whole or low fat milk, skim milk, buttermilk, reconstituted milk powder, condensed milk, dried milk, whey, whey permeate, lactose, mother liquid from crystallization of lactose, whey protein concentrate, or cream. Obviously, the milk substrate may originate from any mammal, e.g. being substantially pure mammalian milk, or reconstituted milk powder.

Prior to fermentation, the milk substrate may be homogenized and pasteurized according to methods known in the art.

"Homogenizing" as used herein means intensive mixing to obtain a soluble suspension or emulsion. If homogenization is performed prior to fermentation, it may be performed so as to break up the milk fat into smaller sizes so that it no longer separates from the milk. This may be accomplished by forcing the milk at high pressure through small orifices.

"Pasteurizing" as used herein means treatment of the milk substrate to reduce or eliminate the presence of live organisms, such as microorganisms. Preferably, pasteurization is attained by maintaining a specified temperature for a specified period of time. The specified temperature is usually attained by heating. The temperature and duration may be selected in order to kill or inactivate certain bacteria, such as harmful bacteria. A rapid cooling step may follow.

"Fermentation" in the methods of the present invention means the conversion of carbohydrates into alcohols or acids through the action of a microorganism. Preferably, fermentation in the methods of the invention comprises conversion of lactose to lactic acid.

Fermentation processes to be used in production of dairy products are well known and the person of skill in the art will know how to select suitable process conditions, such as temperature, oxygen, amount and characteristics of microorganism(s) and process time. Obviously, fermentation conditions are selected so as to support the achievement of the present invention, i.e. to obtain a dairy product in solid (such as a cheese) or liquid form (such as a fermented milk product).

In the present context, the term "mutant" should be understood as a strain derived from a strain of the invention by means of e.g. genetic engineering, radiation and/or chemical treatment, and/or selection, adaptation, screening, etc. It is preferred that the mutant is a functionally equivalent mutant, e.g. a mutant that has substantially the same, or improved, properties with respect to suitability for ambient storage as the mother strain. Such a mutant is a part of the present invention. Especially, the term "mutant" refers to a strain obtained by subjecting a strain of the invention to any conventionally used mutagenization treatment including treatment with a chemical mutagen such as ethane methane sulphonate (EMS) or N-methyl-N'-nitro-N-nitroguanidine (NTG), UV light or to a spontaneously occurring mutant. A mutant may have been subjected to several mutagenization treatments (a single treatment should be understood one mutagenization step followed by a screening/selection step), but it is presently preferred that no more than 20, no more than 10, or no more than 5, treatments are carried out. In a presently preferred mutant, less than 1%, or less than 0.1%, less than 0.01%, less than 0.001% or even less than 0.0001% of the nucleotides in the bacterial genome have been changed (such as by replacement, insertion, deletion or a combination thereof) compared to the mother strain.

In the present context, the term "variant" should be understood as a strain which is functionally equivalent to a strain of the invention, e.g. having substantially the same, or improved, properties with respect to suitability for ambient storage as the mother strain. Such variants, which may be identified using appropriate screening techniques, are a part of the present invention.

Preferably, the "mutant" and "variant" of the strain of the present invention has the property that when added in an amount of 2.5×10exp07 CFU per g to a fermented milk test product in the form of yogurt obtained by fermentation with a starter culture containing *Streptococcus thermophilus* and *Lactobacillus delbrueckii bulgaricus* at a temperature of 43° C. to a pH of 4.3, which has been heat treated at 75° C. for 30 seconds, the strain is capable of retaining viability in an amount of at least 1.0×10exp03 CFU/g at the end of a storage period of the test product of 150 days at a temperature of 25° C., and wherein the pH at most decreases 0.8 units during the storage period.

Preferably, the "mutant" and "variant" of the strain of the present invention has less than 25, more preferably less than 10, more preferably less than 9, more preferably less than 8, more preferably less than 7, more preferably less than 6, more preferably less than 5, more preferably less than 4, more preferably less than 3, more preferably less than 2 mutations in the amino acid sequence of one or more of the proteins of the strain. In this connection the term "mutation" means a mutation selected from the group consisting of a substitution, a deletion and an insertion.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The expression "fermented milk product" means a food or feed product wherein the preparation of the food or feed product involves fermentation of a milk substrate with a lactic acid bacteria. "Fermented milk product" as used herein includes but is not limited to products such as thermophilic fermented milk products, e.g. yogurt, mesophilic fermented milk products, e.g. sour cream and buttermilk, cheese as well as fermented whey.

The term "thermophile" herein refers to microorganisms that thrive best at temperatures above 43° C. The industrially most useful thermophilic bacteria include *Streptococcus* spp. and *Lactobacillus* spp. The term "thermophilic fermentation" herein refers to fermentation at a temperature above about 35° C., such as between about 35° C. to about 45° C. The term "thermophilic fermented milk product" refers to fermented milk products prepared by thermophilic fermentation of a thermophilic starter culture and include such fermented milk products as set-yogurt, stirred-yogurt and drinking yogurt, e.g. Yakult.

The term "mesophile" herein refers to microorganisms that thrive best at moderate temperatures (15° C.-40° C.). The industrially most useful mesophilic bacteria include *Lactococcus* spp. and *Leuconostoc* spp. The term "mesophilic fermentation" herein refers to fermentation at a temperature between about 22° C. and about 35° C. The term "mesophilic fermented milk product" refers to fermented milk products prepared by mesophilic fermentation of a mesophilic starter culture and include such fermented milk products as buttermilk, sour milk, cultured milk, smetana, sour cream, Kefir and fresh cheese, such as quark, tvarog and cream cheese.

The term "cheese" is understood to encompass any cheese, including hard, semi-hard and soft cheeses, such as cheeses of the following types: Cottage, Feta, Cheddar, Parmesan, Mozzarella, Emmentaler, Danbo, Gouda, Edam, Feta-type, blue cheeses, brine cheeses, Camembert and Brie. The person skilled in the art knows how to convert the coagulum into cheese, methods can be found in the literature, see e.g. Kosikowski, F. V., and V. V. Mistry, "Cheese and Fermented Milk Foods", 1997, 3rd Ed. F. V. Kosikowski, L. L. C. Westport, Conn. As used herein, a cheese which has a NaCl concentration below 1.7% (w/w) is referred to as a "low-salt cheese".

In the present context the term "fruit juice" refers to the liquid naturally contained in fruit prepared by mechanically squeezing or macerating fresh fruits without the presence of heat and solvents. The "fruit juice" may consist of juice from one type of fruit or a mixture of more than one type of fruit.

The term "fruit drink" in the present context refers to a beverage having a fruit juice content of between 0 to 29%.

The term "nectar" in the present context refers to a beverage having a fruit juice content of between 30 to 99% fruit juice.

In the present context the term "puree" refers to fruits prepared by grounding, pressing and/or straining into the consistency of a thick liquid or a soft paste without the presence of heat and solvents. "Puree" is made of 100% fruit as opposed to being made from just the juice of the fruit.

In the present context the term "fruit beverage" refers to a beverage comprising fruit juice, fruit concentrate and/or fruit puree. The term "fruit beverage" covers "fruit juice", "fruit drink" and "nectar" as defined herein. The "fruit beverage" may be either one containing pulp, or one from which the pulp has been removed by such an operation as centrifugation.

The term "adding aseptically" means without introducing or introducing a minimum of any microorganism other than the ambient storage lactic acid bacteria.

The term "cereal product" means any product obtained from a cereal or grain biological source material, including oat, corn, barley, rye, buckwheat, wheat and rice.

The term "lactose-deficient" is used in the context of the present invention to characterize LAB which either partially or completely lost the ability to use lactose as a source for cell growth or maintaining cell viability. Such LAB are capable of metabolizing one or several carbohydrates selected from sucrose, galactose and/or glucose or another fermentable carbohydrate. Since these carbohydrates are not naturally present in milk in sufficient amounts to support fermentation by lactose deficient mutants, it will be necessary to add these carbohydrates to the milk. Lactose deficient and partially deficient LAB can be characterized as white colonies on a medium containing lactose and X-Gal.

The expression "X.X×10expYY" and "X.XEYY", both mean $X.X \times 10^{YY}$, and the two said expressions are used interchangeably.

The expression "CFU" means Colony Forming Units.

Specific Items of the Invention

1. An ambient storage lactic acid bacteria strain, wherein the strain when added in an amount of 2.5×10exp07 CFU per g to a fermented milk test product in the form of yogurt obtained by fermentation with a starter culture containing *Streptococcus thermophilus* and *Lactobacillus delbrueckii bulgaricus* at a temperature of 43° C. to a pH of 4.3, which has been heat treated at 75° C. for 30 seconds, is capable of retaining viability in an amount of at least 1.0×10exp03 CFU/g at the end of a storage period of the test product of 150 days at a temperature of 25° C., and wherein the pH at most decreases 0.8 units during the storage period, and wherein the strain is selected from the group consisting of *Lactobacillus paracasei*, *Lactobacillus rhamnosus*, *Lactobacillus fermentum* and *Lactobacillus delbrueckii* subsp. *bulgaricus*, and mutants and variants thereof.

2. Strain according to claim 1, wherein the strain is capable of retaining viability in an amount of at least 1.0×10exp03 CFU/g, preferably at least 5.0×10exp03 CFU/g, more preferably at least 1.0×10exp04 CFU/g, more preferably at least 5.0×10exp04 CFU/g and most preferably at least 1.0×10exp05 CFU/g at the end of the storage period.

3. Strain according to claim 1 or 2, wherein the pH at most decreases 0.7, preferably 0.6, preferably 0.5, preferably 0.4, preferably 0.3, and most preferably 0.2 during the storage period.

4. Strain according to any of the preceding claims, wherein the strain when added in an amount of 2.5×10exp07 CFU per g to the test product increase to an amount of at least 5.0×10exp07 CFU per g, preferably 7.5×10exp07 CFU per g, and most preferably 1.0×10exp08 CFU per g.

5. Strain according to claim 4, wherein the increase of the amount of cells occurs within 45 days of the addition of the strain to the test product, preferably within 40 days, preferably within 35 days, preferably within 30 days, preferably within 25 days, preferably within 20 days, and most preferably within 15 days.

6. Strain according to claim 4 or 5, wherein the amount of cells reaches a maximum within 45 days of the addition of the strain to the test product, preferably within 40 days, preferably within 35 days, preferably within 30 days, preferably within 25 days, preferably within 20 days, and most preferably within 15 days.

7. Composition comprising one or more of the ambient storage lactic acid bacteria strains according to any of claim 1-6.

8. Ambient storage food product with a pH of between 3.4 and 4.4, wherein the product contains at least 1.0×10exp03 CFU per g of the ambient storage strain of claim 1.

9. Food product according to claim 8, wherein product is a chemically acidified product.

10. Food product according to claim 8, wherein the product is a fermented milk product obtained by fermentation of a milk substrate using a starter culture of lactic acid bacteria, wherein the product contains no more than 1×10exp02 CFU of the starter culture per g and at least 1×10exp03 CFU per g of the ambient storage strains of claim 1.

11. Food product according to claim 8, wherein the product is a fermented milk product obtained by fermentation of a milk substrate using a starter culture of lactic acid bacteria, wherein the fermented milk product after fermentation has been subjected to a heat treatment so as to reduce the level of bacteria of the starter culture to no more than 1×10exp02 CFU per g, and wherein after the heat treatment the ambient storage strain of claim 1 has been added aseptically to the heat treated product in an amount of at least 1.0×10exp03 CFU per g.

12. Process for producing an ambient storage food product comprising providing a food product with a pH of between 3.4 and 4.4, subjecting the food product to a heat treatment so as to reduce the level of bacteria to no more than 1×10exp02 CFU per g to obtain a heat treated food product, and adding aseptically to the heat treated food product one or more of the ambient storage lactic acid bacteria strains of claim 1 in a total amount of at least 1.0×10exp03 CFU per g to obtain an ambient storage food product.

13. Process for producing an ambient storage fermented milk product comprising fermentation of a milk substrate using a starter culture of lactic acid bacteria to obtain a starter culture fermented milk product, subjecting the starter culture fermented milk product to a heat treatment so as to reduce the level of bacteria of the starter culture to no more than 1×10exp02 CFU per g to obtain a heat treated fermented milk product, and adding aseptically to the heat treated fermented milk product one or more of the ambient storage lactic acid strains of claim 1 in a total amount of at least 1.0×10exp03 CFU per g to obtain an ambient storage fermented milk product.

14. Use of an ambient storage lactic acid bacteria strain according to claim 1 for adding aseptically to a heat treated food product in a total amount of at least 1.0×10exp03 CFU per g, wherein the heat treated food product has a pH of between 3.4 and 4.4 and has been subjected to a heat treatment so as to reduce the level of starter culture bacteria to no more than 1×10exp02 CFU per g.

15. A lactic acid bacteria strain, wherein the strain is selected from the group consisting of *Lactobacillus paracasei* strain LC-02, CHCC6272, deposited as DSM16572, *Lactobacillus rhamnosus* strain CHCC5366 deposited as DSM23035, *Lactobacillus paracasei* strain CRL 431, CHCC23026 deposited as ATCC 55544, *Lactobacillus paracasei* strain CHCC5584 deposited as DSM32389, *Lactobacillus rhamnosus* LGG® deposited as ATCC53103*, *Lactobacillus fermentum* CHCC14591 deposited as DSM32086, and *Lactobacillus delbrueckii* subsp. *bulgaricus* strain CHCC18944 deposited as DSM28910, and mutants and variants thereof.

EXAMPLES

Example 1

Testing of Ambient Storage Suitability of *Lactobacillus paracasei* and *Lactobacillus rhamnosus*

Milk substrate
Fat level 2.8%*
Protein level 2.8%*
Lactose 3.0%
Sucrose 5.0% (added)
Modified Starch E1442 Cargill type 75720 1.50%
Pectin type LMA CPKelco type LM 106 AS-YA 0.25%
Gellan Gum type Kelcogel YSS 0.05%
*Level in final product, i.e. after heat treatment, addition of the ambient storage strain and storage for 150 days.
Starter Culture
YoFlex® starter culture type YF-L904 containing the two strains *Streptococcus thermophilus* and *Lactobacillus delbrueckii* spp. *bulgaricus*.
Ambient Storage Strains Tested
*Lactobacillus paracasei* strain LC-02, CHCC6272 deposited as DSM16572.
*Lactobacillus rhamnosus* strain CHCC5366 deposited as DSM23035.
*Lactobacillus paracasei* strain CRL 431, CHCC23026 deposited as ATCC 55544.
*Lactobacillus acidophilus* La-5, CHCC2169, deposited as DSM13241.
*Bifidobacterium animalis* BB-12, CHCC5445, deposited as DSM15954 *Lactobacillus helveticus*, (mixture of 4 strains).

*Lactococcus lactis* DN-224, CHCC3955, deposited as DSM11037.

Procedure for Producing Test Product
1. Dispersing the dry ingredients into the milk
2. Resting for 3 hours with gentle stirring
3. Heating the milk until a temperature of 65° C. is reached
4. Homogenization at 150 Bar
5. Heat treatment to 95° C. for 5 min.
6. Cooling to fermentation temperature 43° C.
7. Pump the milk into fermentation vat
8. Inoculation of YoFlex Culture type YF-L904.
9. Fermentation until pH reaches 4.30.
10. Break the curd and stir until smooth structure is obtained
11. Heat treatment at 75° C. for 30 sec.
12. Cooling to 25° C.
Procedure for Testing Ambient Storage Strains
13. Aseptic filling into 100 ml. sterile containers
14. Inoculation of strains & cultures
15. Storage for 6 months at room temperature 25° C.
Method of Cell Counting
1. *L. paracasei* (LC-02, CHCC6272), *L. rhamnosus* (CHCC5366), *L. paracasei* (CRL 431, CHCC23026), *L. acidophilus* (La-5, CHCC2169), and *L. helveticus*
Samples from the test product were grown on MRS agar plates incubated at anaerobic conditions at 37° C. for 3 days.
2. *B. animalis*, BB-12 (CHCC5445)
Samples from the test product were grown on MRS agar plates containing 10% cysteine hydrochloride incubated at anaerobic conditions at 37° C. for 3 days.
3. *Lactococcus lactis*, DN-224 (CHCC3955)
Samples from the test product were grown on M-17 agar plates incubated at aerobic conditions at 30° C. for 3 days.
Results

TABLE 1

| Cell Counts (cfu/g) for storage at 5° C. | | | | |
|---|---|---|---|---|
| Test strain | Day 4/5 | Day 14 | Day 35 | Day 56 |
| L. paracasei, LC-02, CHCC6272 | 5.4E07 | 2.9E07 | 1.7E07 | 2.5E07 |
| L. rhamnosus CHCC5366 | 1.0E07 | 9.3E06 | 1.3E07 | 1.8E07 |
| L. paracasei, CRL 431, CHCC23026 | 1.6E07 | 1.6E07 | 1.3E07 | 1.5E07 |
| L. acidophilus, La-5, CHCC2169 | 7.2E06 | 5.0E04 | 1.4E04 | 1.4E03 |
| B. animalis, BB-12, CHCC5445 | 1.4E07 | 8.3E06 | 4.6E06 | 1.5E06 |
| L. helveticus Mixture of 4 strains | ND | 7.9E06 | 6.4E05 | <1.0E03 |
| Lactococcus lactis, DN-224, CHCC3955 | ND | 1.0E06 | 1.1E05 | 1.0E03 |

ND: No Data

TABLE 2

| Cell Counts (cfu/g) for storage at 25° C. | | | | | | |
|---|---|---|---|---|---|---|
| Test strain | Day 0 | Day 1 | Day 14 | Day 35 | Day 56 | Day 90 | Day 150 |
| L. paracasei LC-02, CHCC6272 | 7.2E06 | 1.4E07 | 3.7E08 | 3.4E08 | 2.1E08 | 5.0E06 | 5.9E04 |

TABLE 2-continued

Cell Counts (cfu/g) for storage at 25° C.

| Test strain | Day 0 | Day 1 | Day 14 | Day 35 | Day 56 | Day 90 | Day 150 |
|---|---|---|---|---|---|---|---|
| L. rhamnosus CHCC5366 | 2.5E07 | 4.9E07 | 9.0E07 | 1.6E08 | 4.2E07 | 2.2E06 | 5.0E03 |
| L. paracasei, CRL 431, CHCC23026 | 1.1E07 | 1.9E07 | 1.3E08 | 1.5E08 | 7.9E07 | 2.1E07 | 1.2E05 |
| L. acidophilus La-5, CHCC2169 | ND | ND | <1.0E02 | <1.0E01 | ND | ND | ND |
| B. animalis BB-12, CHCC5445 | ND | ND | 4.0E05 | <1.0E03 | ND | ND | ND |
| L. helveticus Mixture of 4 strains | ND | ND | 3.6E07 | 9.4E07 | 1.5E06 | <1.0E01 | ND |
| L. lactis, DN-224 CHCC3955 | ND | ND | <1.0E03 | ND | ND | ND | ND |

ND: No Data

TABLE 3

Cell Counts (cfu/g) for storage at 25° C.

| Test yogurt starter culture* | Day 14 | Day 35 | Day 56 | Day 90 |
|---|---|---|---|---|
| TC-X11 | Lb: 4.0E02 | ND | ND | ND |
|  | St: 5.7E04 | ND | ND | ND |
| CH-1 | Lb: 2.3E04 | Lb: 2.5E02 | Lb: 2.5E02 | Lb: <10E01 |
|  | St: <1.0E03 | St: 4.0E01 | St: 4.0E01 | St: <10E01 |
| Acidifix | Lb: 5.0E01 | ND | ND | ND |
|  | St: <1.0E03 | ND | ND | ND |
| Yoflex Advance 1.2 | Lb: 1.6E04 | Lb: <1.0E02 | ND | ND |
|  | St: 5.0E04 | St: <1.0E02 | ND | ND |
| Yoflex Premium 1.0 | Lb: 8.0E02 | ND | ND | ND |
|  | St: 1.0E05 | ND | ND | ND |
| Yoflex Mild 2.0 | Lb: 2.0E02 | ND | ND | ND |
|  | St: <1.0E03 | ND | ND | ND |

ND: No Data

All yogurt starter cultures are commercial products from Chr. Hansen A/S in the form of blends of *Streptococcus thermophilus* (St) and *Lactobacillus delbrueckii* subsp. *bulgaricus* (Lb).

For the three strains stored at 25° C. and followed until 150 days, i.e. *L. paracasei*, LC-02, CHCC6272, *L. rhamnosus* CHCC5366 and *L. paracasei*, CRL 431, CHCC23026, the pH was 3.55 for all three strains.

As will appear from the results shown in Table 1, after 56 days at a standard refrigerated reference temperature of 5° C. the three strains *L. paracasei*, LC-02, CHCC6272, *L. rhamnosus* CHCC5366 and *L. paracasei*, CRL 431, CHCC23026 maintained a cell count of above 1×10exp07, and *B. animalis*, BB-12, CHCC5445 also maintained a high cell count of above 1×10exp06 (CFU/g), whereas the three strains *L. acidophilus*, La-5, CHCC2169, *L. helveticus* (mixture of 4 strains), and *Lactococcus lactis*, DN-224, CHCC3955 only maintained a cell count 1.4×10exp03 (CFU/g) or lower.

As will appear from the results shown in Table 2, after 150 days at a temperature of 25° C. (ambient temperature) the three strains *L. paracasei*, LC-02, CHCC6272, *L. rhamnosus* CHCC5366 and *L. paracasei*, CRL 431, CHCC23026 maintained a cell count of 5×10exp03 CFU/g or higher. In comparison, for the 4 other strains tested the cell count at ambient temperature dropped quickly to a level of below 1.0×10exp03 CFU/g. Thus, the three strains *L. paracasei*, LC-02, CHCC6272, *L. rhamnosus* CHCC5366 and *L. paracasei*, CRL 431, CHCC23026 have superior properties with respect to long term storage at ambient temperature while at the same time maintaining a pH level of 3.55. A pH level of 3.55 is acceptable for a number of fermented milk products. Also, as will appear from Table 2, the cell count has a characteristic temporal profile, wherein it initially increases to reach a maximum at 14 days after which the cell count starts to decrease slowly until 56 days after which the rate of decrease of the cell count starts to increase towards 150 days. With respect to the acidification profile of the samples, it is surprising that it was possible to maintain a pH level of 3.55 in view of the fact that the said 3 strains are all lactose fermenting and that the samples contain lactose.

As will appear from Table 3, the cell counts for all the *Streptococcus thermophilus* and *Lactobacillus delbrueckii* subsp. *bulgaricus* strains of the different yogurt starter cultures dropped quickly to low levels.

Example 2

Testing of Ambient Storage Suitability of *Lactobacillus paracasei* and *Lactobacillus delbrueckii* subsp. *bulgaricus*

Milk Substrate
Fat level 2.7%*
Protein level 2.9%*
Lactose 3.0%
Sucrose 7.0% (added)
Modified Starch E1442 Cargill type 75720 1.50%
Pectin type LMA CPKelco type LM 106 AS-YA 0.30%
Gellan Gum type Kelcogel YSS 0.05%
*Level in final product, i.e. after heat treatment, addition of the ambient storage strain and storage for 150 days.

Starter Culture
YoFlex® starter culture type YF-L904 containing the two strains *Streptococcus thermophilus* and *Lactobacillus delbrueckii* spp. *bulgaricus*.

Ambient Storage Strains Tested
*Lactobacillus paracasei* strain CHCC5584 deposited as DSM32389.
*Lactobacillus delbrueckii* subsp. *bulgaricus* CHCC18944 deposited as DSM28910.

20 other strains selected from the following species:
*Lactobacillus helveticus*
*Lactobacillus plantarum*
*Streptococcus thermophilus*
*Lactococcus lactis*
*Pediococcus acidilactici*

Procedure for Producing Test Product
16. Dispersing the dry ingredients into the milk
17. Resting for 3 hours with gentle stirring
18. Heating the milk until a temperature of 65° C. is reached
19. Homogenization at 150 Bar
20. Heat treatment to 95° C. for 5 min.
21. Cooling to fermentation temperature 43° C.
22. Pump the milk into fermentation vat
23. Inoculation of YoFlex Culture type YF-L904.
24. Fermentation until pH reaches 4.30.
25. Break the curd and stir until smooth structure is obtained
26. Heat treatment at 75° C. for 20 sec.
27. Cooling to 25° C.

Procedure for Testing Ambient Storage Strains
28. Aseptic filling into 100 ml. sterile containers
29. Inoculation of strains & cultures
30. Storage for 6 months at room temperature 25° C.

Method of Cell Counting
Cell counting was carried out using an automated liquid handling process on a Hamilton apparatus. The process involves plating the sample to be assayed on a suitable agar substrate layer at a number of sequential dilutions and counting the number of colonies for the first dilution of the sequence for which at least one colony grows.

Results
Among the 22 tested strains only 5 strains had a cell count of more than $1.0 \times 10^{03}$ CFU/g after 6 months. Among the said 5 strains with a cell count of more than $1.0 \times 10^{03}$ CFU/g after 6 months, only two samples had a pH above 3.5:
*Lactobacillus paracasei* strain CHCC5584 deposited as DSM32389.
*Lactobacillus delbrueckii* subsp. *bulgaricus* CHCC18944 deposited as DSM28910.

TABLE 4

| | Cell Counts (cfu/g) for storage at 25° C. | | | |
|---|---|---|---|---|
| Test strain | 0 months | 2 months | 4 months | 6 months |
| *L. paracasei* CHCC5584 | 1.00E06 | 1.00E06 | 8.00E02 | 1.00E04 |
| pH | 4.23 | 3.54 | 3.60 | 3.51 |
| *L. delbrueckii* subsp. *bulgaricus* CHCC18944 | 3.70E05 | 7.00E05 | 1.00E06 | 5.50E05 |
| pH | 4.19 | 3.97 | 3.70 | 3.51 |

Example 3

Testing of Ambient Storage Suitability of Three *Lactobacillus* Species

Experimental Plan
The object of the present experiment is to test the effect on the survivability of four *Lactobacillus* strains of the following parameters:
pH of heat-treated yogurt base: 4.0 and pH 4.3 were tested.
CFU dosage level: 10000 CFU and 100000 CFU were tested.
Level of sucrose in milk base: 0, 3 and 7% sucrose were tested.

Starter Culture
YoFlex® starter culture type YF-L904 containing the two strains *Streptococcus thermophilus* and *Lactobacillus delbrueckii* spp. *bulgaricus*.

Milk Substrate

TABLE 5

| Composition of milk substrate | | |
|---|---|---|
| | % | g |
| 3.5% fat milk | 74.3 | 89160.0 |
| Water | 23.45 | 28140.0 |
| Modified starch - Roquette | 1.5 | 1800 |
| Pectin | 0.12 | 144.0 |
| Gelan gum | 0.03 | 36.0 |
| Whey Protein Concentrate (WPC) 80 - Nutrilac YO-7830 | 0.60 | 720.0 |
| | 100.0 | 120000 |

Procedure for Producing Test Product
1. De-aeration of milk base at 350-400 mbar.
2. Homogenization at 60° C. at 150 bar.
3. Heat treatment at 95° C. for 5 min. in plate pasteurizer. Cool to 5° C.
4. Inoculation with culture
5. Fermentation temperature: 43° C.
6. Final heat treatment: 74° C. for 20 seconds in holding tube.
7. Packing in flow bench into sterile cups.

Ambient Storage Strains Tested
*Lactobacillus paracasei* strain CHCC6272 deposited as DSM16572.
*Lactobacillus fermentum* strain CHCC14591 deposited as DSM32084.
*Lactobacillus rhamnosus* strain LGG deposited as ATCC53103.

Analysis

CFU plating by RAPID-CFU: Development (every 2 months).

Carbohydrate and small acid content by HPLC: Every 2 months.

pH measurement by change of color indicator (hue): Development (every 1 month).

CFU Determination

CFU is determined by a procedure involving automated plating using a Hamilton robot.

pH Measurement

The pH was measured by means of a measurement of change in color. As color indicator Bromocresol Purple/Green was used in a 50/50 mixture. The color indicator solution was prepared as follows: A 1000 ml volumetric flask was filled partly with milli-Q water, and 1.00 g Bromocresol Green and 1.0 g Bromocresol Purple was transferred to the flask. 2 ml 4N NaOH was added to the flask, which was then stirred and filled to 1000 ml with milli-Q water.

The color intensity of the samples was read by a flatbed scanner. A change in hue of 1 unit corresponds approximately to a change in pH of 0.05 pH units.

Results

TABLE 6

CFU counts and pH development during 4 months of storage of heat treated ambient yogurt product (test product) with a start pH of 4.0 and a CFU dosage of 10000

| Test strain | 0 months | | | 2 months | | | 4 months | | |
|---|---|---|---|---|---|---|---|---|---|
| Sucrose (%) | 0 | 3 | 7 | 0 | 3 | 7 | 0 | 3 | 7 |
| No added test strain | 0 | 0 | 0 | 0 | 0 | 0 | 0 | 0 | 0 |
| pH | 138.9 | 138.9 | 138.9 | 140.9 | 140.7 | 140.1 | 139.0 | 141.6 | 140.5 |
| L. paracasei CHCC6272 | 7.0E05 | 4.5E02 | 6.5E05 | 1.0E06 | 1.0E06 | 1.0E06 | 1.4E07 | 3.5E06 | 4.0E06 |
| pH | 139.4 | 139.0 | 138.8 | 134.9 | 134.4 | 134.9 | 140.6 | 140.0 | 138.9 |
| L. fermentum CHCC14591 | 1.75E07 | 1.65E07 | 1.2E07 | 5.5E05 | 1.0E06 | 5.5E05 | 7.0E05 | 7.0E05 | 1.5E05 |
| pH | 139.5 | 138.8 | 138.8 | 139.7 | 141.3 | 140.2 | 140.7 | 138.2 | 140.2 |
| L. rhamnosus LGG ® | 2.55E06 | 2.5E06 | 8.0E05 | 1.0E06 | ND | 1.0E06 | 1.6E07 | 1.6E07 | 6.5E06 |
| pH | 139.3 | 138.8 | 138.7 | 131.6 | ND | 134.9 | 130.9 | 121.6 | 131.6 |

TABLE 7

CFU counts and pH development during 4 months of storage of heat treated ambient yogurt product (test product) with a start pH of 4.3 and a CFU dosage of 10000

| Test strain | 0 months | | | 2 months | | | 4 months | | |
|---|---|---|---|---|---|---|---|---|---|
| Sucrose (%) | 0 | 3 | 7 | 0 | 3 | 7 | 0 | 3 | 7 |
| No added test strain | 0 | 0 | 0 | 0 | 0 | 0 | 0 | 0 | 0 |
| pH | 145.7 | 145.3 | 144.7 | 146.4 | 147.1 | 146.6 | 142.6 | 145.0 | 145.3 |
| L. paracasei CHCC6272 | 1.0E05 | 7.0E04 | 7.5E04 | 1.0E06 | 1.0E06 | 1.0E06 | 1.05E07 | 1.45E07 | 1.0E07 |
| pH | 146.3 | 145.6 | 145.3 | 137.7 | 136.6 | 136.9 | 147.3 | 148.1 | 146.4 |
| L. fermentum CHCC14591 | 1.55E06 | 3.15E06 | 4.5E05 | 5.05E05 | 5.5E05 | 1.0E06 | 9.5E04 | 1.95E05 | 3.7E05 |
| pH | 146.3 | 145.7 | 145.3 | 147.3 | 147.5 | 147.1 | 147.2 | 150.1 | 149.3 |
| L. rhamnosus LGG ® | 1.5E04 | 3.0E04 | 4.5E04 | 1.0E06 | 1.0E06 | 1.0E06 | 1.2E07 | 1.45E07 | 1.0E07 |
| pH | 146.3 | 145.7 | 145.1 | 137.5 | 136.9 | 137.5 | 134.7 | 133.4 | 136.2 |

TABLE 8

CFU counts and pH development during 4 months of storage of heat treated ambient yogurt product (test product) with a start pH of 4.0 and a CFU dosage of 100000

| Test strain | 0 months | | | 2 months | | | 4 months | | |
|---|---|---|---|---|---|---|---|---|---|
| Sucrose (%) | 0 | 3 | 7 | 0 | 3 | 7 | 0 | 3 | 7 |
| No added test strain | 0 | 0 | 0 | 0 | 0 | 0 | 0 | 0 | 0 |
| pH | 140.3 | 139.3 | 139.3 | 139.9 | 140.2 | 141.0 | 136.6 | 138.6 | 138.5 |
| L. paracasei CHCC6272 | 5.0E06 | 2.0E06 | 3.5E06 | 1.0E06 | 1.0E06 | 1.0E06 | 1.4E07 | 9.0E06 | 7.0E06 |
| pH | 140.0 | 139.8 | 139.7 | 134.4 | 134.1 | 135.0 | 136.6 | 138.6 | 138.5 |

TABLE 8-continued

CFU counts and pH development during 4 months of storage of heat
treated ambient yogurt product (test product) with a start pH of 4.0 and a CFU
dosage of 100000

| Test strain | 0 months | | | 2 months | | | 4 months | | |
|---|---|---|---|---|---|---|---|---|---|
| Sucrose (%) | 0 | 3 | 7 | 0 | 3 | 7 | 0 | 3 | 7 |
| L. fermentum CHCC14591 | 1.5E07 | 1.25E07 | 8.5E06 | 5.5E05 | 5.5E06 | 5.5E05 | 7.0E05 | 6.0E06 | 6.1E06 |
| pH | 140.7 | 139.9 | 139.8 | 136.8 | 140.6 | 140.5 | 139.7 | 140.5 | 140.4 |
| L. rhamnosus LGG ® | 4.5E06 | 2.0E06 | 1.1E06 | 1.0E06 | 1.0E06 | 1.0E06 | 1.3E07 | 1.35E07 | 4.0E06 |
| pH | 139.9 | 139.7 | 139.5 | 134.8 | 135.8 | 136.8 | 134.9 | 135.7 | 142.6 |

TABLE 9

CFU counts and pH development during 4 months of storage of heat
treated ambient yogurt product (test product) with a start pH of 4.3 and a CFU
dosage of 100000

| Test strain | 0 months | | | 2 months | | | 4 months | | |
|---|---|---|---|---|---|---|---|---|---|
| Sucrose (%) | 0 | 3 | 7 | 0 | 3 | 7 | 0 | 3 | 7 |
| No added test strain | 0 | 0 | 0 | 0 | 0 | 0 | 0 | 0 | 0 |
| pH | 144.4 | 144.3 | 143.9 | 143.9 | 143.0 | 143.0 | 141.7 | 141.5 | 140.0 |
| L. paracasei CHCC6272 | 8.0E05 | 7.5E05 | 5.5E05 | 1.0E06 | 1.0E06 | 1.0E06 | 1.1E07 | 1.1E07 | 8.0E06 |
| pH | 144.5 | 144.1 | 143.5 | 135.7 | 135.2 | 136.0 | 141.7 | 141.5 | 140.0 |
| L. fermentum CHCC14591 | 1.0E06 | 6.5E06 | 1.0E06 | 1.0E06 | 1.0E05 | 1.0E06 | 2.5E04 | 1.1E06 | 3.5E04 |
| pH | 144.4 | 144.4 | 143.9 | 143.3 | 144.4 | 143.9 | 139.5 | 143.7 | 145.3 |
| L. rhamnosus LGG ® | 4.5E05 | 6.0E05 | 6.5E05 | 1.0E06 | 1.0E06 | 1.0E06 | 1.0E06 | 2.0E06 | 8.0E05 |
| pH | 144.8 | 144.1 | 144.1 | 135.9 | 136.4 | 137.5 | 135.1 | 135.1 | 138.0 |

As will appear from Tables 6-9, for all sample combinations of 1) the *Lactobacillus* strain to be tested, 2) pH of heat-treated yogurt base, 3) CFU dosage level and 4) level of sucrose in the heat-treated yogurt, the level of CFU/g was between 2.5E04 and 1.6E07 after 4 months of storage.

Comparing yogurt base starting pH: For both levels of CFU dosage and no added sucrose, a yogurt base starting pH of 4.0 results in higher CFU counts after 4 months than a yogurt base starting pH of 4.3 for all tested strains. For both levels of CFU dosage and 3% added sucrose, a yogurt base starting pH of 4.0 results in higher CFU counts after 4 months than a yogurt base starting pH of 4.3 for the *L. rhamnosus* and *L. fermentum* strains. For a CFU dosage of 10000 CFU/g and a level of 7% added sucrose, a yogurt base starting pH of 4.3 results in higher CFU counts after 4 months than a yogurt base starting pH of 4.0 for all tested strains.

Comparing CFU dosage levels: For the *L. rhamnosus* strain, the CFU dosage level of 10000 CFU/g for both yogurt base starting pH results in higher CFU counts after 4 months than a CFU dosage level of 100000 CFU/g for all levels of added sucrose. For an added sucrose level of 7% and a yogurt base starting pH of 4.3, a CFU dosage level of 10000 CFU/g results in higher CFU counts after 4 months than a CFU dosage level of 100000 CFU/g for all tested strains.

Comparing the levels of added sucrose: For a CFU dosage of 10000 CFU/g and a yogurt base starting pH of 4.0, a sucrose level of 0% results in higher CFU counts after 4 months than sucrose levels of 3 and 7% (however, for the *L. rhamnosus* and *L. fermentum* strains and a sucrose level of 3% the CFU counts are the same as those for 0%). For a CFU dosage of 100000 CFU/g and a yogurt base starting pH of 4.3, a sucrose level of 3% results in higher CFU counts after 4 months than sucrose levels of 0 and 7%.

In order to achieve a high survivability of *Lactobacillus* bacteria during long term storage of ambient temperature heat-treated yogurt, it is believed that it is essential to achieve a moderate, balanced growth of bacteria. Thus, if the bacteria inoculated into the yogurt base have limiting growth conditions, the bacteria culture will not be able to sustain itself and the cell count will decrease in an unacceptable extent. In this case, the decrease of the yogurt pH will only be small due to the limited bacteria growth. On the other hand, if the bacteria inoculated into the yogurt base have growth promoting conditions, the bacteria culture will enter into a phase of high growth resulting in a strong pH drop, which will eventually stop of bacteria growth and potentially inactivate or lyse the bacteria cells. Also, such a strong pH drop is undesired as it might render the taste of the yogurt too acidic.

In conclusion, it is believed that that it is essential to achieve a moderate, balanced growth of bacteria. A number of factors are important to achieve such a moderate, balanced growth of bacteria. Among these factors are the parameters tested in this Example as listed above. In particular, the starting pH of the yogurt base is important, because it influences both the level of bacteria growth and the final pH reached during storage. The CFU dosage level is important because it determines in the peak level of bacteria reached during storage and hence the level of pH drop. Finally, it is common practice to add sucrose to heat-treated, ambient yogurt as a sweetener. The sucrose level is important for the survivability of bacteria during long term storage because it is believed that sucrose will degrade during storage to form glucose and fructose hence forming a carbohydrate source for growth of bacteria and causing increased growth of the bacteria.

As will appear from the results of the present Example, both the yogurt base starting pH levels of 4.0 and 4.3 result in high CFU counts of between 2.5E04 and 1.6E07 after 4 months of storage. Whether a yogurt base starting pH level of 4.0 or 4.3 results in a higher cell count after 4 months depend on the other factors tested as described in detail above.

As will appear from the results of the present Example, both the CFU dosage levels of 10000 and 100000 CFU/g result in high CFU counts of between 2.5E04 and 1.6E07 after 4 months of storage. Whether a CFU dosage level of 10000 or 100000 CFU/g results in a higher cell count after 4 months depend on the other factors tested as described in detail above.

As will appear from the results of the present Example, both the levels of added sucrose of 0, 3 and 7% result in high CFU counts of between 2.5E04 and 1.6E07 after 4 months of storage. Whether a level of added sucrose of 0, 3 or 7% results in a higher cell count after 4 months depend on the other factors tested as described in detail above.

Example 4

Testing of Ambient Storage Suitability of Two Lactobacillus Species in Low pH Fermented Milk Product (Yakult)

Fermented Milk Product Base

In this Example a commercial Yakult product with a low pH (pH 3.8) was used as a base for adding ambient storage strains for the testing of their survivability, post-acidification and growth during long term storage at ambient temperature.

Ingredients: Water, sugar, syrup, Skimmed Milk Powder, glucose, *Lactobacillus paracasei* (live lactic acid bacteria>3.0E08 CFU/g), and flavor.

Nutrition value: The commercial product per 100 ml contained 1.2 g protein, 0 g fat and 15.4 g carbohydrate.

Ambient Storage Strains Tested

*Lactobacillus fermentum* strain CHCC14591 deposited as DSM32084.

*Lactobacillus rhamnosus* strain LGG deposited as ATCC53103.

Procedure for Producing Test Product

The commercial Yakult samples were in a first step pasteurized at 74° C. for 20 seconds in a Mini Thermisation Unit (MTU). The pasteurized samples were then filled into sterile 100 ml cups in a LAF bench. The cups were then inoculated with the ambient storage test strains at a level of 1.0E06/ml and stored at 25° C. for 3 months.

Results

TABLE 10

|  | Month | CFU/ml | pH |
| --- | --- | --- | --- |
| L. rhamnosus | 0 | 3.70E07 | 3.55 |
| strain LGG ® | 1.5 | 1.08E07 |  |
|  | 3 | 1.30E06 | 3.15 |
| L. fermentum | 0 | 1.05E07 | 3.5 |
| strain CHCC14591 | 1.5 | 3.70E07 |  |
|  | 3 | 9.80E07 | 3.4 |

As will appear from Table 10, the cell count was very high after 3 months of storage at 25° C. for both strains tested, i.e. it was higher than the inoculated level. For the *L. fermentum* strain CHCC14591 the pH only dropped 0.1 units during 3 months of storage at 25° C., which must be considered to be a very low level of post-acidification at 25° C., in particular in view of the fact that the cell count has increased in this period. For the *L. rhamnosus* strain LGG®, the pH drop during 3 months of storage at 25° C. was somewhat higher, i.e. 0.4 units, which is acceptable for some fermented milk products.

Deposits and Expert Solution

The Applicant requests that a sample of the deposited microorganism should be made available only to an expert approved by the Applicant.

The strains of the invention have been deposited previously and have the following accession numbers:

*Lactobacillus paracasei* strain LC-02, CHCC6272, deposited as DSM16572 on 2016 May 10 at Deutsche Sammlung von Mikroorganismen und Zellkulturen GmbH (DSM), Inhoffenstr. 7B, D-38124 Braunschweig.

*Lactobacillus rhamnosus* strain CHCC5366, deposited as DSM23035 on 2012 Feb. 2 at Deutsche Sammlung von Mikroorganismen und Zellkulturen GmbH (DSM), Inhoffenstr. 7B, D-38124 Braunschweig.

*Lactobacillus acidophilus* La-5, CHCC2169, deposited as DSM13241 on 2003 Sep. 30 at Deutsche Sammlung von Mikroorganismen und Zellkulturen GmbH Maschroder Weg 1b, D-38124 Braunschweig.

*Bifidobacterium animalis* BB-12, CHCC5445, deposited as DSM15954 on 2003 Sep. 30 at Deutsche Sammlung von Mikroorganismen und Zellkulturen GmbH Maschroder Weg 1b, D-38124 Braunschweig.

*Lactococcus lactis* DN-224, CHCC3955, deposited as DSM11037 on 1996 Jun. 26 at Deutsche Sammlung von Mikroorganismen und Zellkulturen GmbH Maschroder Weg 1b, D-38124 Braunschweig.

*Lactobacillus paracasei* strain CHCC5584 deposited as DSM32389 on 2016 Nov. 2 at Deutsche Sammlung von Mikroorganismen und Zellkulturen GmbH, Inhoffenstr. 7B, D-38124 Braunschweig.

*Lactobacillus fermentum* strain CHCC14591 deposited as DSM32086 on 2015 Jul. 16 at Deutsche Sammlung von Mikroorganismen und Zellkulturen GmbH, Inhoffenstr. 7B, D-38124 Braunschweig.

*Lactobacillus delbrueckii* subsp. *bulgaricus* strain CHCC18944 deposited as DSM28910 on 2014 Jun. 12 at Deutsche Sammlung von Mikroorganismen und Zellkulturen GmbH, Inhoffenstr. 7B, D-38124 Braunschweig.

*Lactobacillus paracasei* strain LC-01, CHCC2115, deposited as DSM19465 on 2007 Jun. 27 at Deutsche Sammlung von Mikroorganismen und Zellkulturen GmbH, Inhoffenstr. 7B, D-38124 Braunschweig.

*Lactobacillus rhamnosus* strain CHCC12697 deposited as DSM24616 on 2011 Mar. 1 at Deutsche Sammlung von Mikroorganismen und Zellkulturen GmbH, Inhoffenstr. 7B, D-38124 Braunschweig.

*Lactobacillus paracasei* strain CHCC7155 deposited as DSM18875 on 2006 Dec. 19 at Deutsche Sammlung von Mikroorganismen und Zellkulturen GmbH, Inhoffenstr. 7B, D-38124 Braunschweig.

The deposits were made according to the Budapest Treaty on the international recognition of the deposit of microorganisms for the purposes of patent procedure.

The Applicant requests that a sample of the deposited microorganism should be made available only to an expert approved by the Applicant.

The invention claimed is:

1. A process for producing an ambient storage food product, comprising
   subjecting a food product with a pH of between 3.4 and 4.4 to a heat treatment to reduce the level of bacteria in the food product to no more than $1 \times 10^2$ CFU/g, to obtain a heat-treated food product, and
   aseptically adding to the heat-treated food product one or more ambient storage lactic acid bacteria strains in a total amount of at least $1 \times 10^3$ CFU/g, to obtain an ambient storage food product,
   wherein the pH of the ambient storage food product decreases by at most 0.8 units during a storage period of from 1 to 10 days,
   wherein the one or more ambient storage lactic acid bacteria strains are of a species selected from *Lactobacillus paracasei*, *Lactobacillus fermentum* and *Lactobacillus delbrueckii* subsp. *bulgaricus*, wherein the one or more ambient storage lactic acid bacteria strains, when added in an amount of $2.5 \times 10^7$ CFU/g to a fermented milk test product, retains viability in an amount of at least $1.0 \times 10^3$ CFU/g after a storage period of the fermented milk test product of 150 days at 25° C., and wherein the pH of the fermented milk test product decreases by at most 0.8 units during the storage period of the fermented milk test product, wherein the fermented milk test product is a yogurt obtained by fermentation of a milk substrate with a starter culture containing *Streptococcus thermophilus* and *Lactobacillus delbrueckii bulgaricus* at 43° C. to a pH of 4.3 and heat treated at 75° C. for 30 seconds.

2. A process according to claim 1, wherein the one or more ambient storage lactic acid bacteria strains retain viability in the fermented milk test product in an amount of at least $5.0 \times 10^3$ CFU/g at the end of the 150 day storage period of the fermented milk test product.

3. A process according to claim 1, wherein the pH of the fermented milk test product decreases by at most 0.7 during the 150 day storage period of the fermented milk test product.

4. A process according to claim 1, wherein the ambient storage lactic acid bacteria strains, when added to the fermented milk test product in an amount of $2.5 \times 10^7$ CFU/g, increases to an amount of at least $5.0 \times 10^7$ CFU/g during the 150 day storage period of the fermented milk test product.

5. A process according to claim 4, wherein the increase in the amount of ambient storage lactic acid bacteria strain occurs within 45 days of addition of the strain to the fermented milk test product.

6. A process according to claim 4, wherein the amount of the strain reaches a maximum within 45 days of addition of the strain to the fermented milk test product.

7. A process according to claim 1, further comprising storing the ambient storage food product at ambient temperature for a period of at least one day.

8. A process according to claim 1, wherein the one or more ambient storage lactic acid bacteria strains are selected from
   *Lactobacillus paracasei* strain LC-02 (CHCC6272) deposited at Deutsche Sammlung von Mikroorganismen and Zellkulturen GmbH (DSMZ) under accession number DSM16572;
   *Lactobacillus paracasei* strain CRL 431 (CHCC23026) deposited at the American Type Culture Collection (ATCC) under accession number ATCC 55544;
   *Lactobacillus paracasei* strain CHCC5584 deposited at DSMZ under accession number DSM32389;
   *Lactobacillus fermentum* strain CHCC14591 deposited at DSMZ under accession number DSM32086, and
   *Lactobacillus delbrueckii* subsp. *bulgaricus* strain CHCC18944 deposited at DSMZ under accession number as DSM28910,
   and mutants and variants of any thereof, wherein the bacterial genome of said mutants differs from the bacterial genome of the respective mother strain by less than 1% of the nucleotides in the bacterial genome, and wherein the mutants and variants have less than 25 mutations in the amino acid sequence of one or more proteins of the ambient storage lactic acid bacteria strain.

9. A process according to claim 1, wherein the one or more ambient storage lactic acid bacteria strains are selected from *Lactobacillus paracasei* strain LC-02 (CHCC6272) deposited at DSMZ under accession number DSM16572; *Lactobacillus paracasei* strain CRL 431 (CHCC23026) deposited at the ATCC under accession number ATCC 55544; *Lactobacillus paracasei* strain CHCC5584 deposited at DSMZ under accession number DSM32389; *Lactobacillus fermentum* strain CHCC14591 deposited at DSMZ under accession number DSM32086, and *Lactobacillus delbrueckii* subsp. *bulgaricus* strain CHCC18944 deposited at DSMZ under accession number DSM28910.

10. A process according to claim 1, wherein the food product with a pH of between 3.4 and 4.4 is a starter culture fermented milk product obtained by fermentation of a milk substrate with a lactic acid bacteria starter culture.

11. A process according to claim 10, wherein the starter culture fermented milk product has a protein content of more than 5.1% (w/w).

12. A process according to claim 10, wherein the starter culture fermented milk product is not subjected to diluting.

13. A process according to claim 1, wherein the food product with a pH of between 3.4 and 4.4 is a chemically acidified product.

14. An ambient storage food product made by a process according to claim 1.

* * * * *